May 16, 1961  C. W. GUNTER  2,984,378
HIGH SPEED STRIP STAMP MACHINE
Filed Oct. 17, 1958  6 Sheets-Sheet 1

INVENTOR.
Colie Walton Gunter
BY
Bacon & Thomas
ATTORNEYS

May 16, 1961  C. W. GUNTER  2,984,378
HIGH SPEED STRIP STAMP MACHINE
Filed Oct. 17, 1958  6 Sheets-Sheet 5

Fig. 11.

INVENTOR.
Colie Walton Gunter
BY
Bacon & Thomas
ATTORNEYS

United States Patent Office 2,984,378
Patented May 16, 1961

2,984,378

HIGH SPEED STRIP STAMP MACHINE

Colie Walton Gunter, Durham, N.C., assignor to Sperry Rand Corporation, Wilmington, Del., a corporation of Delaware Filed Oct. 17, 1958, Ser. No. 767,847

12 Claims. (Cl. 216—55)

This invention relates to machines for applying revenue stamps or the like to bottles or similar containers. While the specific embodiment described herein is directed to a machine for applying elongated precut revenue stamps to the caps and necks of bottles, it is to be understood that the description is merely illustrative of the invention and that the principles thereof may be employed in machines for applying labels or other material to containers or objects other than bottles and that the machine is adapted to receive such material from either a supply of precut labels or stamps or from a continuous roll or strip thereof at a fixed station adjacent the turret.

In general the machine comprises a rotary turret adapted to receive bottles thereon in predetermined positions on the turret. The turret is provided with spotting means for properly orienting the bottles as received thereon and the machine is preferably provided with a plurality, for instance, twelve, stations for the reception of bottles. Each station on the turret is further provided with vertically reciprocable means arranged to descend toward the bottle after a stamp has been positioned thereover, to first clamp the midportion of same against the top of the bottle, then to release the stamp from the means by which it was held in position and thereafter press the laterally projecting portions of the stamp downwardly into contact with opposite sides of the bottle neck. The means at the fixed station adjacent the turret for supplying stamps thereto include means for receiving stamps from a magazine containing a supply of precut stamps but it will be obvious to those skilled in the art that the stamps may be received from mechanism arranged to cut individual stamps from a continuous roll. The stamp transfer means which receive the stamp from the supply hold the stamp in a taut and unwrinkled condition and move the stamp along a predetermined path tangent to the path of the stamp holding means on the turret when those means are in a radially outer position. The stamp holding means on the turret comprise circumferentially spaced upwardly directed needle points, the leading one of which is timed to intersect the path of a stamp on the transfer means as the leading end of that stamp reaches the point of tangency between the two paths. Thus the leading needle at each station on the turret impales the leading end of a stamp on the transfer means and that leading end is simultaneously released from the transfer means. In like manner the trailing needle at each station of the turret impales the trailing end of the stamp and the stamp is thus transferred to the stamp holding means on the turret, ready for application to a bottle, in the manner to be described.

By the arrangement employed, a turret having a great many stations thereon may be employed and thus be capable of handling a great many bottles in a relatively short period of time. The stamp transfer means involves rotary parts and is designed to transfer at least two stamps during each revolution thereof whereby high speed output of the machine may be accomplished without operating the stamp transfer means at an unduly high speed.

It is therefore an object of this invention to provide a high speed strip stamp applying machine capable of greater output than any similar machine heretofore known and which is highly efficient and reliable in operation.

Another object of the invention is to provide a machine of the type set forth wherein means are provided to adjust the operative parts thereof whereby bottles of different size and/or shape may be accommodated and processed by simple adjustments and a minimum of parts replacement.

Still another object of this invention is to provide a high speed strip stamp applying machine adapted to be supplied with stamps from a supply of precut stamps or to receive its stamps from a continuous roll or strip thereof.

A further object of this invention is to provide a machine of the type set forth wherein a stamp is under positive control at all times.

A still further object of this invention is to provide a machine of the type set forth including means for receiving bottles or the like in random orientation and to properly orient the bottles before application of the stamp thereto whereby the stamp or the like always bears the same relationship to other labels or characteristics of the bottle.

An additional object of the invention is to provide a machine of the type set forth including means for applying glue or other suitable adhesive material to the stamps before application to the bottle and for controlling the quantity of glue applied to the stamps.

Another additional object of the invention is to provide a machine of the type set forth wherein movable means progressively press a stamp against a bottle and are so controlled as to obviate subsequent distortion or displacement of the stamp during completion of a machine cycle.

Other objects and advantages will become apparent to those skilled in the art as the description proceeds in connection with the accompanying drawings, wherein.

Figure 1:
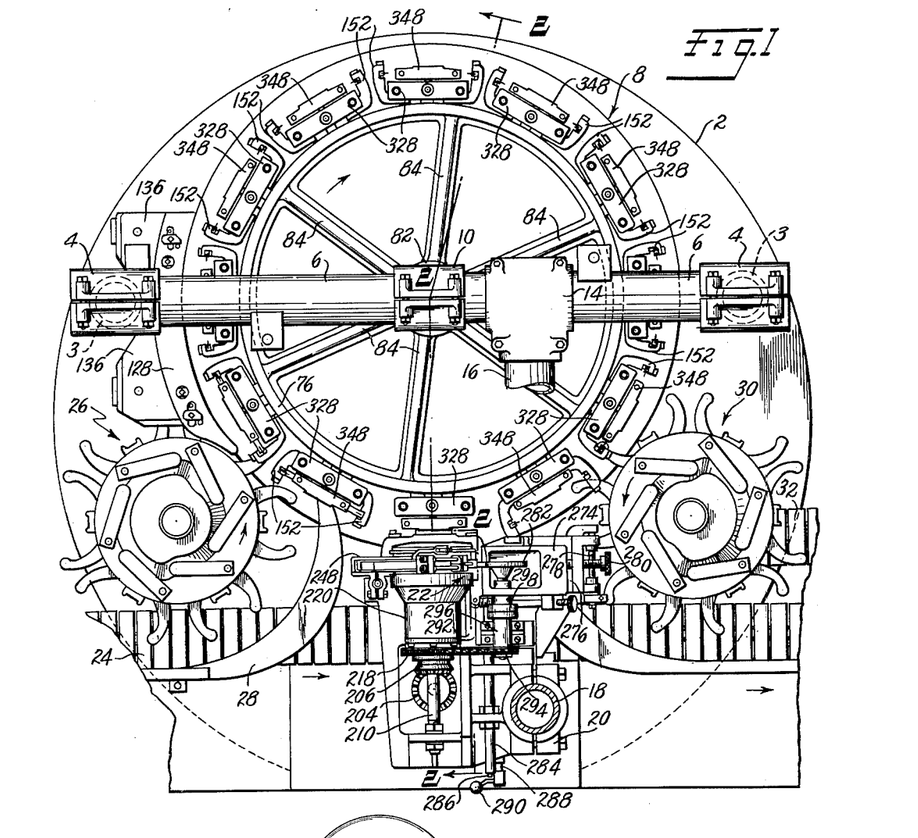
Fig. 1 is a schematic top plan view of a machine embodying the present invention with certain parts broken away to facilitate illustration.
Figure 2:
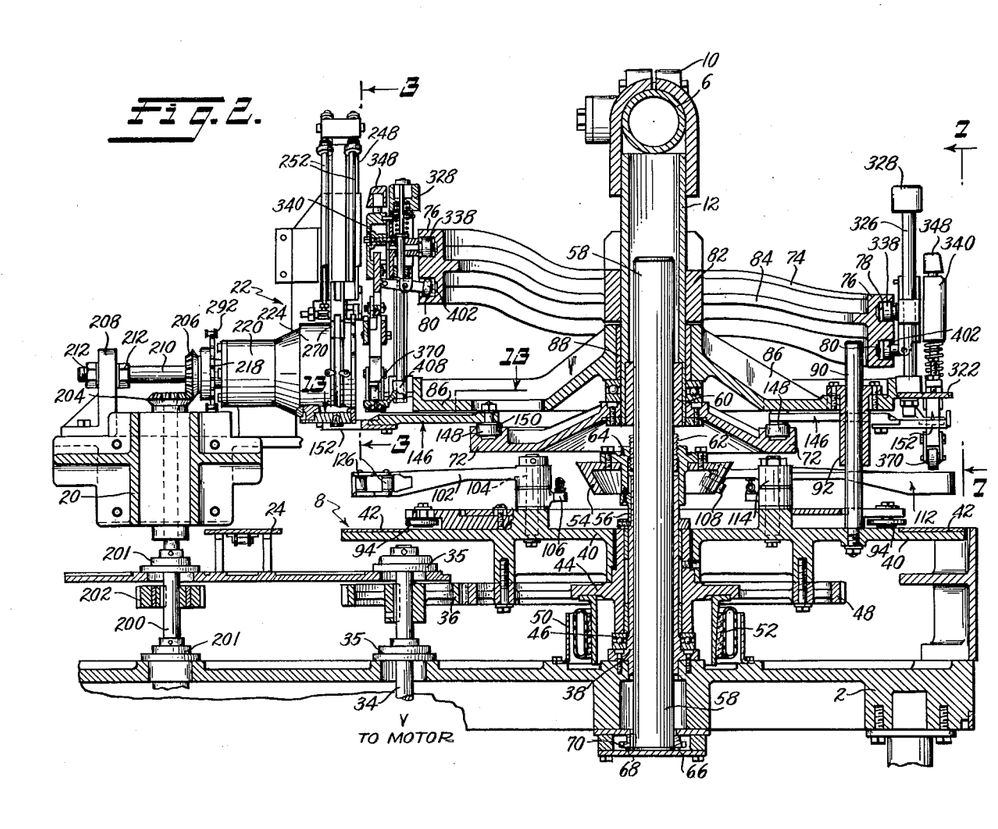
Fig. 2 is a vertical sectional view taken substantially along the line 2—2 of Fig. 1.

Referring first to Figs. 1 and 2, the machine illustrated herein by way of example comprises a base structure 2 constituting a base or frame for the machine. As shown, the base structure is generally circular in outline but may be of any desired configuration. A pair of tubular posts 3 is fixed to and extends upwardly from opposite sides of the base 2 and each post is capped by a clamp fitting 4 which secures a transverse tubular overarm 6 to the tops of the upstanding posts. The overarm 6 extends over the center of a turret structure 8. A central clamp fitting 10 on overarm 6 supports the upper end of a tubular shaft portion 12 to extend downwardly along the axis of turret 8. A second clamp fitting 14 serves to secure a forwardly extending tubular overarm 16 to the overarm 6 and a fitting similar to fittings 4 secures the overarm 16 to an upstanding tubular post 18 at the forward part of the machine and which upstanding post is likewise secured to the machine base 2.

A support bracket 20 is clamped to the upstanding post 18 and forms a support for a stamp transfer and gluing mechanism designated generally by numeral 22.

A suitable conveyor 24 is provided to convey bottles or the like toward the machine from the left side thereof as seen in Fig. 1, and to a transfer turret 26. The transfer turret 26 is shown only schematically but serves, in conjunction with guide rail 28, to transfer bottles from the conveyor 24 to the turret 8 in properly timed relation to rotation of the turret so as to deliver a bottle thereto at each bottle station on the turret. A further transfer turret designated generally at 30 is arranged to receive stamped bottles from the turret 8 and deliver the same to the take-away portion of conveyor 24 to convey them toward the right as viewed in Fig. 1. The transfer turret 30 preferably effects delivery of only half of the stamped bottles to the conveyor 24, alternate bottles being carried by the transfer turret 30 to a second take-away conveyor 32 whereby bottles are delivered from the machine in two parallel streams. The structure of the transfer turrets 26 and 30 do not constitute a part of the present invention, it being understood that any suitable conveyor arrangement and means for effecting transfer of articles to and from conveying means and the turret 8 may be employed.

Referring particularly to Fig. 2, the base 2 of the machine is provided with a suitable motor (not shown) arranged to rotate a drive shaft 34 journalled in suitable bearings 35 in the machine frame and to which a drive gear 36 is fixed. The machine frame 2 also supports a fixed central hollow bushing 38 fixed thereto at the center of rotation of the turret 8 and on which a lower turret portion 40 is journalled. The lower turret portion 40 constitutes a generally horizontal circular plate having an annular bottle supporting surface 42 at its outer periphery. The plate 40 is fixed to a hub structure 44 journalled on the bushing 38 and which is supported by thrust bearing 46. A turret gear 48 is fixed to the hub 44 and meshes with drive gear 36. A brake drum 50 is fixed to the machine frame 2 and a pneumatic brake structure 52 is carried by the hub 44 whereby the turret may be brought to a stop abruptly whenever necessary and held securely against rotation.

The central bushing 38 extends upwardly past the lower turret disc 40 and has a conical cam 54 keyed thereto by a key 56 whereby the conical cam is vertically adjustable on the bushing 38 but held against rotation thereon. A hollow shaft 58 is journalled inside the hollow bushing 38 and extends upwardly therethrough and through a bushing 60 on the lower end of the tubular shaft portion 12 previously described as extending downwardly from overarm 6. The shaft 58 is provided with a threaded collar 62 thereon threadedly engaging a hub portion 64 of the conical cam 54. The lowermost end of hollow shaft 58 extends downwardly to a frame plate 66. A friction pad or ring 68 is interposed between the lower face of a sprocket wheel 70 fixed to the lower end of shaft 58 and frame plate 66. Suitable manually operable means (not shown) are provided for rotating sprocket wheel 70 and shaft 58 when desired. Such rotation of shaft 58 effects vertical adjustment of conical cam 54 for a purpose to be described later. The friction pad 68 prevents unintentional "creeping" or rotation of the shaft 58 and thus prevents inadvertent maladjustment of the cam 54, which could occur as a result of vibrations during machine operation.

The suspended shaft portion 12 previously described has a generally concentric cam 72 fixed to the lower end thereof whereby the cam 72 is held in fixed position and against rotation. Spaced upwardly from the cam 72 is a second cam structure 74 having an outer ring 76 provided with upper and lower cam grooves 78 and 80, respectively. The ring portion 76 is supported from fixed hub 82 by means of radial spokes or the like 84. Between the cams 72 and 74 an upper turret portion 86 is journalled on the shaft portion 12 by a suitable bushing 88. Thus the upper turret portion 86 is rotatably mounted on the same axis as the lower turret plate 40 but the two turret portions are independently journalled on the vertical shaft-defining means comprising the member 12 and hollow bushing 38. It is necessary that both the upper turret portion 86 and lower turret portion 40 be rotated in unison and for this purpose the lower turret portion 40 is provided with a plurality (preferably three) of upstanding posts 90 fixed thereto outwardly to the outer periphery of fixed cam 72. The posts 90 extend upwardly through bushings 92 carried by the upper turret portion 86 and thereby impart rotation to the upper turret portion 86 in unison with the lower turret portion 40. The upstanding posts 90 are made necessary by the presence of the fixed cam 72.

Figure 11:
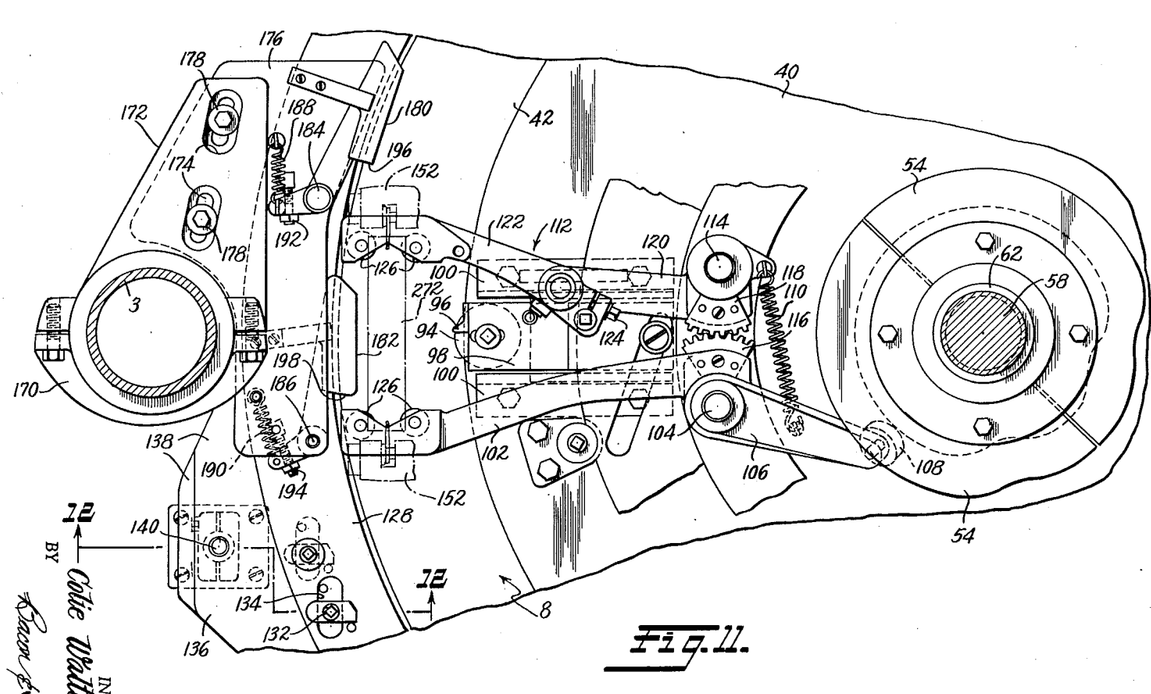
Fig. 11 is a top plan view, on an enlarged scale, of a portion of the machine illustrating the bottle spotting and gripping means at one station on the turret.
Figures 12, 14:
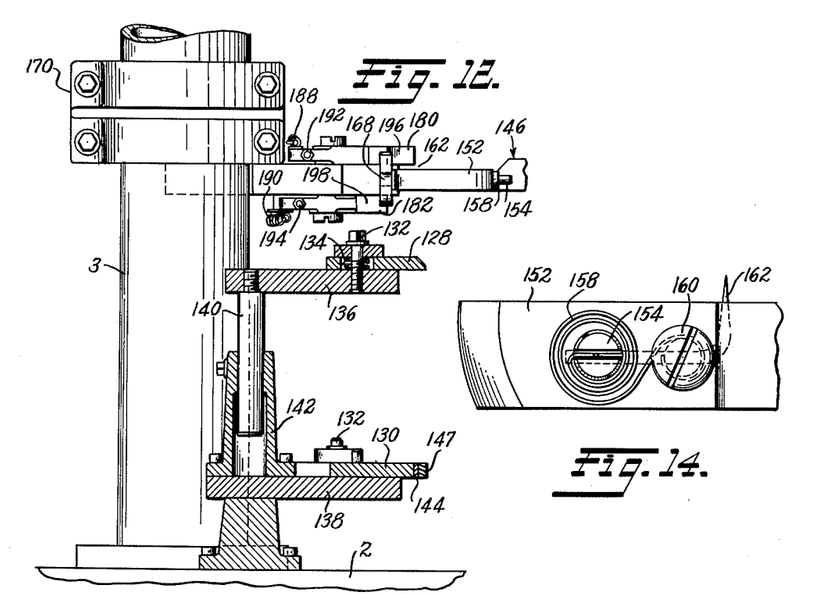
Fig. 12 is a fragmentary vertical sectional view taken substantially along the line 12—12 of Fig. 11.
Fig. 14 is a further enlarged fragmentary view taken along the line 14—14 of Fig. 13.

Referring also to Figs. 11 and 12, in addition to Figs. 1 and 2, each bottle receiving station on the turret 8 arrives at the delivery point of transfer turret 26 in timed relation to delivery of a bottle by the transfer turret 26. The bottle receiving stations of the turret 8 are each defined by structure as shown in Fig. 11. As shown in Fig. 11, the lower turret plate 40 is provided, at each station, with a roller 94 journalled thereon and a fixed projection 96 extending outwardly slightly past the periphery of roller 94. The roller 94 and projection 96 are mounted on a block 98 radially adjustable on the turret portion 40 between guides 100. Thus the rollers 94 and projections 96 may be radially adjusted on turret portion 40 for the purpose of accommodating bottles of different size, as will be described.

A bottle gripper arm 102 is pivoted to the lower turret portion 40 by means of a pin 104 to which the arm 102 is fixed. An arm 106 is also fixed to the pin 104 and carries at its inner end a cam follower roller 108 engaging the conical peripheral surface of cam 54, previously described. A tension spring 110 is arranged to maintain the roller 108 in contact with the peripheral surface of conical cam 54. A second bottle gripper arm designated generally at 112 is pivoted to the turret portion 40 adjacent the arm 102 and on a pivot pin 114. The portions of arms 102 and 112 adjacent the pivot pins 104 and 114 are provided with gear sectors 116 and 118 fixed to the arms 102 and 112, respectively. The gear sectors 116 and 118 are in mesh with each other whereby swinging movements of arm 102, effected by cam 54, result in equal swinging movements of the arm 112 in the opposite direction. Thus the outer ends of arms 102 and 112 are caused to move toward or from each other by equal amounts on opposite sides of the radial center line of the bottle receiving station.

The arm 112 comprises an inner portion 120 to which the gear sector 118 is fixed and an outer portion 122 pivotally adjustable relative to the portion 120. A suitable split adjusting clamp means 124 is provided whereupon the outer portion 122 may be angularly adjusted relative to the portion 120 and clamped in such position of adjustment.

The outer ends of the arms 102 and 112 are provided with similar bottle engaging heads comprising upper and lower spaced plates between which radially spaced rollers 126 are journalled on vertical axes. The area between the pairs of rollers 126 and the roller 94 constitutes a bottle receiving station on the turret portion 40. By referring to Fig. 1 for the moment it will be seen that a bottle delivered by the transfer turret 26 to a bottle receiving station on the turret 8 enters the bottle receiving station just described and before the turret 8 rotates to position that bottle receiving station inwardly of fixed rail 128. Continued rotation of turret 8 in a clockwise direction as seen in Fig. 1 results in the bottle just delivered to a station thereon passing inwardly of the rail 128.

Referring now again to Figs. 11 and 12, the rail 128 is an adjustable upper rail below which is a second adjustable rail 130. Adjustment of the rails 128 and 130 is effected by clamp screws 132 passing through slots 134 in the respective rails and threadedly engaging rail support brackets 136 and 138, respectively. Those rails 128 and 130 may be adjusted radially of the turret 8, within limits, to accommodate bottles of different size. If a greater range of adjustment is necessary, the rails must be replaced and they are readily accessible for that purpose. The rail supporting bracket 136 may be vertically adjusted by vertically moving its supporting posts 140 and clamping the same in different positions of vertical adjustment in supporting bracket 142. Upper rail 128 is preferably of solid metal construction and is provided for the purpose of steadying a bottle on the turret since centrifugal force due to the speed of rotation of the turret would tend to cause a bottle to tilt outward. The bottom rail 130, however, is faced on its inner edge with a facing of rubber or the like 144 covered by a layer of leather 147. The rails 128 and 130 are arcuate in shape and substantially concentric to the axis of the turret 8 and are so adjusted that a bottle engaging the roller 94 and being restrained laterally by rollers 126 will frictionally engage the leather 147 on rail 130. It is contemplated that round bottles be employed having a small projection extending outwardly for a point adjacent the bottom of the bottles. Such bottles are common and the projections thereon are employed as a reference point relative to which labels and other devices may be positioned for the purpose of properly relating a plurality of labels, stamps or the like on the same bottle.

As a bottle is delivered to the turret 8 and the turret rotates to a position where the bottle is radially inwardly of the rail 130, centrifugal force causes the bottle to firmly frictionally engage the resilient facing on that rail and the bottle, therefore, rotates about its own axis or "rolls" along the rail 130 until the projection referred to engages the projection 96 adjacent roller 94. The rollers 126 and 94 permit the bottle to rotate freely in the manner described. When the projection on the bottle engages stop projection 96, rotation of the bottle is stopped and the bottle thereafter merely slides along the rail 130 while the stamp or the like is applied thereto in proper relation to the bottle projection.

The bottle spotting structure thus described is of particular utility in spotting round bottles and is adjustable to accommodate bottles of different diameters. Such adjustment is accomplished by proper positioning of the roller 94, proper positioning of portion 122 relative to portion 120 of the arm 112 and by vertical adjustment of the cam 54 to regulate the range of swinging movement of the arms 102 and 112.

A further feature of the bottle receiving stations, however, resides in the fact that flat bottles of the "flask" type may also be handled by the machine described without any changes in structure or substitution of parts. Such flasks are grasped by the transfer turret 26 with their long horizontal dimension substantially tangent to the axis of the turret and are delivered to the turret 8 with their long horizontal dimension substantially tangent to that turret also. Thus the pairs of rollers 126 engage opposite edges of such a flask and positively hold the same in properly oriented relation while being processed in the machine of the present invention.

As will be obvious to those skilled in the art the cam 54 is so configured that the arms 102 and 122 are open while a bottle is delivered to the turret 8 by transfer turret 26. The cam thereafter effects closing of the arms 102 and 112 to grip the sides of the bottle and those arms remain closed until shortly prior to the time the take-away transfer turret 30 engages the bottle to remove the same from the turret 8.

Figures 3, 4:
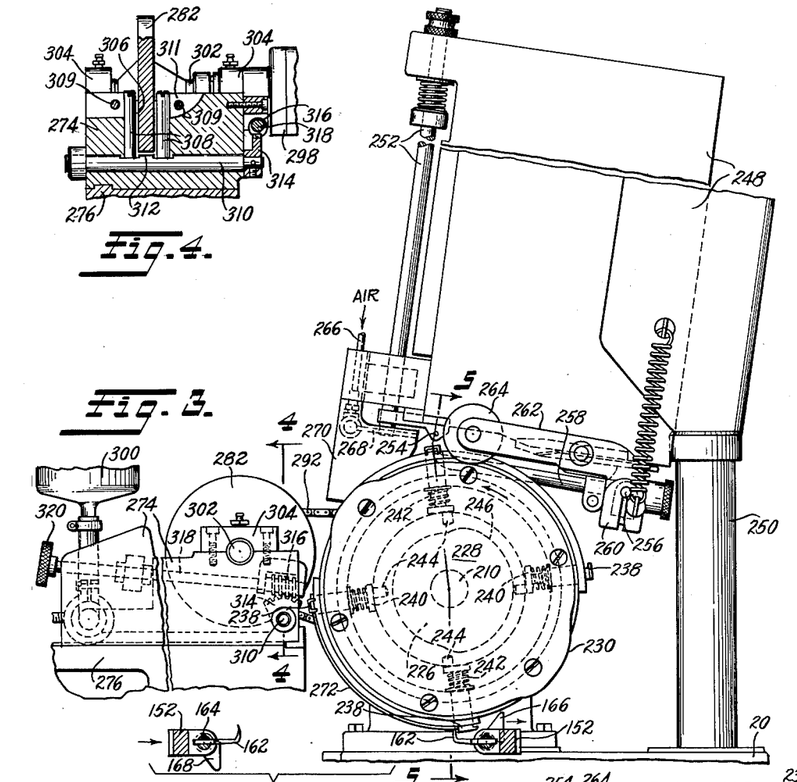
Fig. 3 is an enlarged sectional view taken substantially along the line 3—3 of Fig. 2.
Fig. 4 is a vertical sectional view taken substantially along the line 4—4 of Fig. 3.
Figures 7, 8, 10:
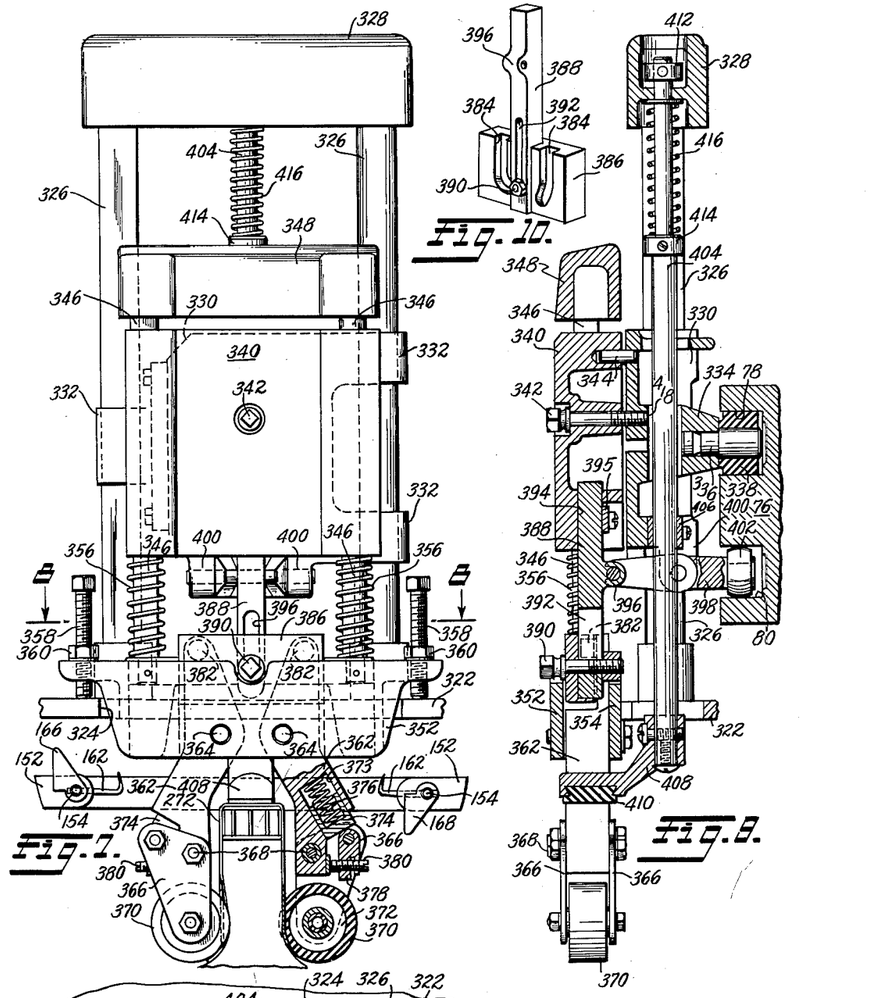
Fig. 7 is a front face view of a presser means of the present invention as seen from the plane 7—7 of Fig. 2.
Fig. 8 is a horizontal sectional view taken along the line 8—8 of Fig. 7.
Fig. 10 is a perspective view of one of the structural elements of the mechanism of Fig. 7.
Figure 13:
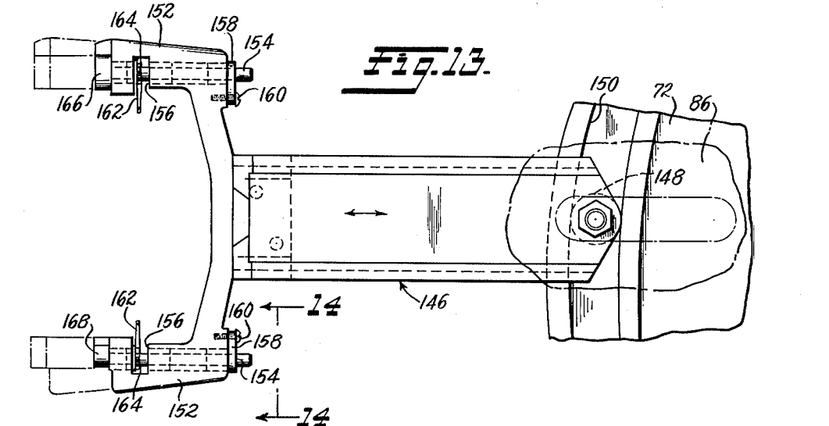
Fig. 13 is a horizontal sectional view, on an enlarged scale, taken substantially along the line 13—13 of Fig. 2.

The upper turret portion 86 is provided with a plurality of radially slidable needle carriages 146 (Figs. 2, 13 and 14) thereon for receiving a stamp and positioning the same over a bottle. There is a needle carriage 146 over each of the bottle receiving stations. The structure of each needle carriage is shown generally in Fig. 13 whereas Fig. 2 shows that the innermost end of each carriage 146 is provided with a cam following roller 148 engaging a cam groove 150 in the lower cam 72 previously described. Each carriage 146 is suitably guided by guide blocks (not identified) on the lower face of upper turret portion 86. Fig. 13 shows that each carriage 146 is bifurcated at its outer end to provide two spaced head portions 152, spaced circumferentially of the turret 8. The heads 152 are equally spaced on opposite sides of the bottle receiving station therebelow on lower turret portion 40. A short shaft 154 is journalled in each head portion 152 with their axes parallel to each other and extending generally radially of the turret 8. The heads 152 are provided with notches 156 in which a portion of each shaft 154 is exposed. At their innermost ends the shafts 154 are connected to one end of a relatively stiff spiral spring 158 (Fig. 14), the other end of which is clamped to the rear face of the head 152 by a suitable clamping screw 160. The portions of the shafts 154 exposed in the slots 156 are provided with radially directed square openings in which squared shank portions of hook-shaped needles 162 are received. The shanks of the needles are held in the openings of shafts 154 by suitable set screws 164 or the like. Figs. 3 and 7 also show the shape of the needles 162. The pointed ends of the needles 162 are arranged to extend substantially directly upwardly when the shanks thereof extend horizontally toward each other, as shown in the drawings. The spiral springs 158 are so adjusted that they normally hold shafts 154 in such position that the shanks of needles 162 extend horizontally toward each other with the points directed upwardly. As stated previously, the springs 158 are relatively stiff so that the needls 162 are held in the described position and can be displaced therefrom only by the use of substantial force.

The shafts 154 extend forwardly through the heads 152 and the forward ends thereof are provided with cam-engaging elements fixed on those shafts. The leading needle shaft 154 is provided with an upwardly directed cam-engaging element 166 whereas the shaft of the trailing needle 162 is provided with a downwardly extending cam-engaging element 168 (see also Figs. 3 and 7).

The upright post 3 at the left of Fig. 1 is provided with a split bracket 170 (see Figs. 11 and 12) above the rails 128 and 130, having a laterally extending support portion 172 provided with a pair of slots 174. A cam support 176 is secured to support 172 by means of screws 178 passing through slots 174. Thus the cam support 176 may be adjusted, within limits, in a direction circumferentially of the turret 8. A pair of cams 180 and 182 is carried by arms pivoted to the support 176 on pins 184 and 186, respectively. The arms carrying the cams 180 and 182 extend past their respective pivots and are urged by springs 188 and 190, respectively, in a direction to project the cams 180 and 182 inwardly toward the center of the turret 8. Suitable stop means 192 and 194 on the cam-carrying arms and the support 76 are provided to adjustably limit the inward movement of the cams 180 and 182 under the influence of springs 188 and 190. The support 176 is of substantial vertical dimension and cam 180 is mounted on the upper surface thereof whereas cam 182 is mounted on the lower surface thereof. The cams 180 and 182 are at the same levels, respectively, as the cam-engaging forward edges of the upwardly and downwardly extending cam-engaging portions 166 and 168 on the needle-carrying shafts 154 previously described. The cams 180 and 182 are provided with end faces 196 and 198 engageable with the cam-engaging edges of elements 166 and 168, respectively. The cam faces 196 and 198 are circumferentially spaced about the turret 8 a distance equal to the circumferential spacing between the leading edges of cam-engaging elements 166 and 168. Thus, upon rotation of the turret 8 with the carriages 146 in their innermost positions, the cam-engaging elements 166 and 168 engage cam faces 196 and 198 simultaneously and the shafts 154 are thereupon rotated in a direction to draw the points of needles 162 downwardly, for a purpose to be described. As will be obvious, the downward withdrawal of the needle points is quite rapid and abrupt.

The cam 72 is so configured that each of the stamp-carrying carriages 146 is in its radially outermost position as it passes the stamp transfer mechanism 22 adjacent the turret, and which will be described in more detail later. As each stamp-carrying carriage passes the mechanism 22 an elongated stamp is placed thereon by impaling opposite end portions of the stamp on the points of needles 162. The cam 72 is configured to draw the carriages 146 inwardly so that the stamp carried by the needles 162 extends directly over the top of a bottle in a bottle receiving station therebelow. A stamp presser mechanism, which will be described in more detail later, is mounted on the upper turret portion 86 for vertical reciprocation and is caused to descend to clamp the midportion of the stamp against the bottle top at about the time that bottle station reaches a position adjacent the post 3 on which cams 180 and 182 are mounted. As the midportion of the stamp is being clamped to the bottle top, the needles 162 are abruptly withdrawn downwardly in a manner previously described to thereby release the end portions of the stamp whereupon the stamp presser mechanism comes into action to press the laterally extending portions of the stamp against the sides of the bottle neck. As will be apparent, the presser mechanism moves downwardly between the heads 152 of the stamp carrying means and without interference therefrom.

Figures 5, 6:
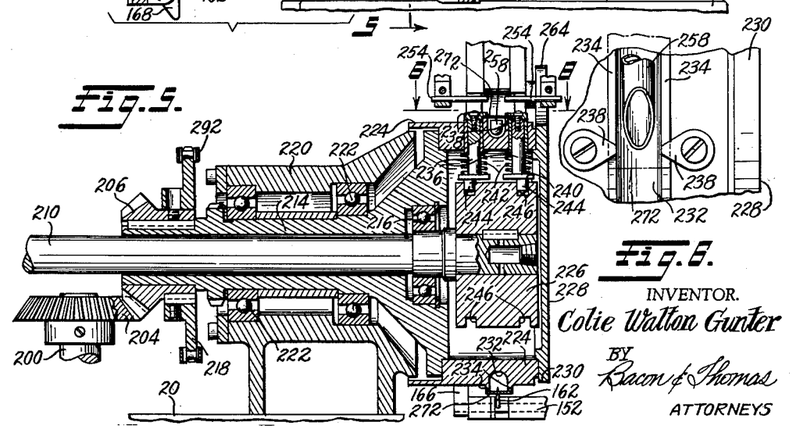
Fig. 5 is a sectional view taken along the line 5—5 of Fig. 3.
Fig. 6 is a fragmentary plan view, on an enlarged scale, taken substantially along the line 6—6 of Fig. 5.

The mechanism for transferring stamps sequentially from a source of supply to the needle carriages just described is designated generally by numeral 22 in Fig. 1. Referring to Fig. 2, a vertical shaft 200 is journalled in suitable bearings 201 in the machine frame 2 and has a gear 202 fixed thereon. Suitable gearing (not shown) meshes with the gear 202 and drive gear 36 whereby the drive shaft 34 rotates shaft 200 in predetermined timed relationship to rotation of the turret 8. The shaft 200 extends upwardly through the bracket 20 previously referred to and wherein it is journalled. The upper end of shaft 200 carries a bevel gear 204 meshing with a second bevel gear 206. An upstanding bracket 208 on the support bracket 20 fixedly supports a stationary horizontal shaft 210 (Figs. 2 and 5) which shaft extends radially toward the center of the turret 8. The shaft 210 is held in fixed position and against rotation in bracket 208 by means of suitable lock nuts 212. Referring particularly to Fig. 5, it will be seen that a hub structure 214 is journalled around the stationary shaft 210 by means including a suitable anti-friction bearing 216 between the hub and shaft. The bevel gear 206 previously described is fixedly keyed to the outer end of hub 214 and is also provided with a sprocket wheel 218 to be referred to later.

A housing 220 is fixedly mounted on the support bracket 20 and surrounds the hub 214. Anti-friction bearings 222 in housing 220 rotatably support the hub 214 in concentric relation to shaft 210. The inner end of hub 214 is enlarged and has fixed thereto a hollow cylindrical transfer wheel 224. The innermost end of fixed shaft 210 has a cylindrical cam 226 keyed and fixed thereon whereby the cam 226 is held stationary. The hollow cylindrical transfer wheel 224 circumscribes and substantially encloses the fixed cam 226. A cover plate 228 is secured to the innermost end of the hollow cylindrical wheel 224 and serves to completely enclose the fixed cam 226. The outer periphery of the cover plate 228 defines a cam surface 230 to be described later. The outer periphery of the transfer wheel 224 is provided with a circumferential groove 232, the edges of which are defined by upstanding ribs 234.

The transfer wheel 224 is provided with four pairs of radially extending clamp devices comprising pins 236 extending through the hollow cylindrical wheel and mounted therein for rotation and radial sliding movement. The outer ends of the pins 236 are provided with laterally directed clamping heads 238 (see also Fig. 6). Each pair of pins 236 comprises one pin on each side of the groove 232. The clamping heads 238 are so dimensioned that when they extend in a direction toward each other, as shown in Fig. 6, they extend only to the opposite edges of the circumferential groove 232. The innermost ends of the pins 236 are provided with bearing portions 240 normally bearing against the outer periphery of the cam 236 and springs 242 constantly urge the pins 236 inwardly of the transfer wheel 224. The bearing portions 240 are further provided with inwardly directed pin elements 244 arranged eccentric to the pins 236 and extending into cam grooves 246 in the periphery of the fixed cam 226. The cam grooves 246 undulate in a direction axially of the cam 226 whereas the outer peripheral surface of that cam undulates radially of the shaft 210. Thus the cam 226 is a "3-dimensional cam." The outer periphery of the cam 226 and the shapes of the cam grooves 246 are such that the pins 236 are reciprocated radially to move clamp heads 238 into or out of engagement with the ribs 234 and to rotate the pins 236 so as to swing the clamp heads 238 from the position shown in Fig. 6 to positions wherein the clamp heads are laterally clear of the outer faces of the ribs 234, for a purpose to be described in greater detail later.

For purpose of illustration, Fig. 3 shows a stamp magazine 248 mounted on a post 250 secured to support bracket 20 and arranged to contain a stack of precut elongated revenue stamps or the like. The magazine is open at least at its bottom lefthand portion whereby an end of the bottom stamp of the supply is exposed downwardly. Spring actuated rods 252 support transverse pins 254 (see also Fig. 5) with their ends extending inwardly beneath the end of the lowermost stamp in the magazine. The pins 254 insure that only a single stamp will be withdrawn downwardly from the magazine by the mechanism to be described. A transverse shaft 256 is journalled on the magazine 248 and has a suction tube 258 fixed thereto. The suction tube 258 extends generally tangentially of the transfer wheel 224 and in the plane of the circumferential groove 232 therein. The outermost end of the suction tube 258 is open and directed upwardly, as shown in Figs. 5 and 6, and is directly below the open bottom portion of the magazine 248 which in turn is substantially directly above the center of the transfer wheel 224. Suction is applied to the tube 258 by suitable means (not shown) and controlled in any suitable manner in timed relationship to operation of the apparatus. Preferably the application of suction to the tube 258, periodically, is controlled by a bottle approaching the machine along conveyor 24 so as to prevent withdrawal of a stamp from the magazine when no bottle will be present in the turret station to be served at that particular portion of the cycle. Such control means, however, form no critical part of the present invention and many control means for the suction may be devised by persons skilled in the art.

A bracket 260 is adjustably clamped to the shaft 256 at a position thereon substantially in the same plane as the cover plate 228 previously described. The adjustable bracket 260 is an integral portion of an arm 262 carrying a cam following roller 264 at its outer end. The arm 262 extends toward the transfer wheel 224 and its cam following roller 264 engages and follows the peripheral cam surface 230 of cover plate 228 previously described. The cam surface 230 is so configured that the suction tube 258 is oscillated by roller 264 and arm 262 in timed relation to passage of the pairs of clamping rods 236 past the open bottom end portion of the magazine 248. The cam surface 230 is so configured and the suction control previously referred to is so operated that the open end of tube 258 is moved upwardly into engagement with an end portion of the bottom stamp in magazine 248 and suction is then applied to the tube so that the end portion of the stamp is gripped thereby. The cam 230 then swings tube 258 downwardly while air under pressure, supplied by conduit 266, is ejected through nozzle 268 toward the end of the stamp to assist in separating the bottom stamp from the remaining stamps in the magazine. Cam 230 lowers the outer end of tube 258 and the stamp gripped thereby until the said end of tube 258 enters the peripheral groove 232 and engages the side edges of that end of the stamp with the peripheral faces of the spaced ribs 234. The cams 226 and 230 are so configured that as soon as the end of the stamp is brought into engagement with the periphery of the ribs 234 as just described, a pair of clamping pins 236 is positioned adjacent that end of the stamp and operation of cam 226 causes the heads 238 to swing inwardly to overlie the edge portions of the stamp and further causes the pins 236 to be moved radially inwardly whereby the heads 238 firmly clamp opposite edge portions of a stamp to the opposite edge portions of the groove 232 with the stamp overlying and covering the groove. The action just described occurs as a leading pair of stamp clamping means arrives at the top of the transfer wheel. Continued rotation of the transfer wheel 224 in a counterclockwise direction as seen in Fig. 3 results in longitudinally withdrawing the bottom stamp from magazine 248. As the stamp is withdrawn from the magazine 248 a shoe 270, carried by the magazine, causes the stamp to wrap itself around the periphery of the transfer wheel 224 and the next pair of clamping pins 236 arrives at the top of the wheel just as the trailing edge of the stamp is withdrawn from the magazine. At that time the pair of clamping pins at the trailing edge of the stamp are actuated in the described manner to engage and clamp the trailing edge of that stamp to the transfer wheel. The configuration of the cam grooves 246 is such that the clamping heads 238 engage the trailing edge of the stamp while moving radially inwardly of the wheel 224 and while rotating in such direction that the clamping heads 238 tend to stretch the stamp on the transfer wheel. Thus any wrinkles or misalignment of a stamp on the transfer wheel is eliminated. Numeral 272 in Fig. 5 indicates a stamp clamped against the transfer wheel in the manner described. The cam 230 is so configured that the open end of the tube 258 remains within the groove 232, as shown in Fig. 5, during the entire interval of time when a stamp is being withdrawn from the magazine 248. After the trailing end of the stamp has been withdrawn from the magazine and clamped to the transfer wheel, the tube 258 rises to grip the next stamp and draw the leading edge downwardly in time to meet the next succeeding pair of clamp pins 236.

The stationary cam 72 on the main turret is so configured that the needle carriage 146 is in its outermost position at the time it passes the position of the transfer wheel 224. In its outermost position the carriage 146 places needles 162 in a circular path of rotation coincident with the center line of the groove 232 of transfer wheel 224. The needles extend upwardly sufficiently to position their points within the groove 232. The drive gearing is so designed and proportioned that the peripheral speed of the transfer wheel 224 is equal to the linear speed of the needles 162 when in their outer positions as shown in Fig. 5. Thus the leading needle will arrive at a point directly below the transfer wheel at the same time as the leading end of a stamp clamped thereon and the point of the needle will penetrate the leading end of the stamp whereupon cam 226 operates to release that stamp from the transfer wheel and thus transfer the leading end of the stamp to the leading needle 162. The needle then leads the leading end of the stamp tangentially off the transfer wheel until the trailing needle of that carriage penetrates the trailing end of the stamp, which is then released, and the entire stamp is thus transferred to the needle carriage 146. The needle carriage is then moved radially inwardly of turret 8 to position the stamp in overlying relation to a bottle in the bottle station therebelow.

Before a stamp is transferred to the needle carriage, however, it is necessary that glue or other suitable adhesive be applied to the stamp so that it will adhere to the bottle to which it is applied. As described, the stamps are fed to and gripped by the transfer wheel at the top thereof and released from the transfer wheel at the bottom. Means are provided for applying glue to the outer face of each stamp as it moves from a position at the top of the transfer wheel to a position at the bottom thereof.

A glue-applying means is mounted on the support bracket 20 adjacent the transfer wheel mechanism just described. By reference to Fig. 1 it will be seen that a glue pot 274 is mounted in substantially the plane of transfer wheel 224. A supporting plate 276 is pivoted on the support bracket 20 on an axis defined by rod 278. By suitable means, including a hand screw 280, the glue pot 274 is removably clamped to the plate 276 whereby it may be removed or replaced at will. The glue pot 274 has a glue wheel 282 rotatably mounted thereon in position to transfer glue from the pot to a stamp on the transfer wheel, as will be described. As shown in Fig. 3, the glue wheel 282 is positioned with its periphery substantially coincident with the path of movement of the outer surface of a stamp 272 on the transfer wheel. However, means are provided for adjusting that spacing whereby the thickness of glue applied to the stamp may be regulated.

Referring again to Fig. 1, a shaft 284 is journalled on the support bracket 20 and extends inwardly to a position under the pivoted supporting plate 276. A suitable eccentric or cam (not shown) is fixed to the inner end of shaft 284 so that rotation thereof will pivot supporting plate 276 and rod 278 and thus raise or lower the glue wheel 282. It will be obvious that raising or lowering the glue wheel 282 will change the center-to-center distance between the glue wheel and the stamp transfer wheel and thus regulate the thickness of glue applied to a stamp. The shaft 284 is provided with a squared end portion 286 for engagement by a suitable tool, wrench or the like to effect the adjustment described. A further shaft 288 (Fig. 1) is journalled on the support bracket 20 and is provided at its outer end with an operating handle 290. The shaft 288 is connected to suitable mechanism (not shown), which may include a toggle or similar linkage (not shown) whereby the entire glue pot assembly may be swung upwardly completely clear of the transfer wheel to render the glue pot assembly inoperative.

The glue pot 274 has been described as being removably mounted on the plate 276. Rotation of the glue wheel 282 is effected from the sprocket 218 (Fig. 5), previously described. The sprocket 218 drives a sprocket chain 292 and a sprocket wheel 294 on a stub shaft journalled on supporting plate 276 by means of a suitable bearing 296. The stub shaft has the sprocket wheel 294 fixed thereto at its outer end and its inner end mounts a readily separable one-way clutch device 298. The details of the clutch device 298 are not shown but any suitable one-way clutch may be employed wherein the driving and driven parts are readily separable. Thus the glue pot may be clamped on or removed from the plate 276 by simply withdrawing the driven portion of the clutch 298 from the driving portion. It is contemplated that a hand wheel, not shown, be provided for rotating the entire machine of this invention through a fraction of a cycle of operation or through one or more cycles for purpose of effecting adjustments and/or repairs. When the machine is driven by such a hand wheel it is often necessary to rotate the machine in a reverse direction, in which case it is necessary that the glue wheel be not rotated and that the same be rotated only in a forward direction. Thus the necessity for a one-way clutch drive to the glue wheel.

Referring now to Figs. 3 and 4, the glue pot 274 comprises a suitable container for a supply of liquid glue and a reservoir 300. The reservoir 300 is suitably supported and connected to the interior of the glue pot 274 so that only a small quantity of glue need be retained in the glue pot to thus prevent undue hardening thereof on exposure to air. Glue wheel 282 is rotatably mounted on the glue pot 274 by means of shaft 302 journalled in suitable bearings 304 on the glue pot. The driven element of one-way clutch 298 is fixed to the outer end of the shaft 302. The glue wheel 282 is a flat disc wheel having a cylindrical periphery and the glue pot 274 is provided with a notch 306 in its forward wall through which the periphery of the glue wheel 282 passes and extends toward the transfer wheel 224. The sides of the notch 306 are defined by rotatably adjustable pins 308. Each of the pins 308 is provided with a flattened or grooved side (not shown) whereby rotation thereof will position an edge of the groove or flat side nearer to or farther from the adjacent side face of glue wheel 282. Thus, the pins 308 may be adjusted to scrape all glue from the side faces of wheel 282 without unduly interfering with rotation thereof. Screws 309 passing through groove 311 in the front wall of the glue pot serve to clamp pins 308 in adjusted position. The bottom of the notch 306 is defined by a transverse shaft 310 having a flattened or grooved portion 312 adjacent the periphery of glue wheel 282. The shaft 310 is rotatably mounted in the glue pot 274 and is provided at one end with a worm sector 314 fixed thereto. Worm sector 314 meshes with a worm 316 fixed to an end of a shaft 318 journalled on an exterior face of the glue pot 274. The shaft 318 extends to the rear of the glue pot and terminates in a hand wheel 320. Thus, by rotating hand wheel 320 the shaft 310 is caused to rotate and thus regulate the spacing between an edge of its flattened portion 312 and the periphery of glue wheel 282 and in that manner the thickness of the film of glue carried by the glue wheel 282 to a stamp on the transfer wheel may be regulated.

It will be obvious that the transfer wheel 224 and the glue wheel 282 both rotate in the same direction. Thus that portion of the glue wheel which applies glue to a stamp moves in a direction opposite to the direction of movement of the stamp and thus effects a satisfactory wiping of the glue thereon, which results in accurate control of the thickness of the glue film on the stamp. The width of the glue wheel 282 is slightly less than the width of the groove 232 on transfer wheel 224 whereby the periphery of the glue wheel passes between the opposed clamping heads 238 holding the stamp to the transfer wheel.

The stamp presser means, heretofore referred to, are best shown in Figs. 2, and 7 to 10. The upper turret portion 86 includes a peripheral plate portion 322 which is cut away or notched as shown at 324 in Fig. 8 at positions directly over the bottle receiving stations of the lower turret portion 40. A pair of upstanding guide posts 326 is fixed to the plate portion 322 on opposite sides of the notched portion 324. The guide posts 326 extend upwardly from the plate portion 322 in parallel relation and are connected at their upper ends by a head brace 328. A slide 330 is provided with guide bushings 332 slidably mounted on the guide posts 326 whereby the slide 330 is vertically slidable on those guide posts. The slide 330 includes a boss 334 in which a pin 336 is mounted and which rotatably carries a cam follower roller 338 extending into the cam groove 78 in cam ring 76, previously described. A second slide portion 340 is fixed to the slide 330 radially outwardly thereof by means of a cap screw 342 and dowel pin 344. Guide rods 346 are slidably guided for vertical movement in the slide portion 340. The guide rods 346 extend above and below the slide portion 340 and their upper ends are fixedly joined by a head or brace member 348. At their lower ends, below the slide portion 340, the rods 346 are respectively fixed to opposed spacer blocks 350 (Fig. 8). Forward plate 352 and rear plate 354 extend between the spacer blocks 350, on opposite sides thereof, and are rigidly fixed thereto in any suitable manner. Compression springs 356 surround the rods 346 between the slide portion 340 and the spacer blocks 350 and thus constantly urge the spacer blocks and plates 352 and 354 downwardly relative to the slide portion 340. Adjustable stops comprising screws 358 and lock nuts 360 are threadedly mounted in respective spacer blocks 350 and extend downwardly therein in position to engage the upper surface of plate portion 322 of turret 86. The head 248 at the upper ends of rods 346 serves to limit downward movement of the spacer blocks 350 relative to slide portion 340. Thus, in the upper position of slide 330—340, the spacer blocks 350 and associated mechanism are raised upwardly above the position shown in Figs. 7 and 9. The adjustable stops 358 thus limit downward movement of the presser rollers, to be described, and may be adjusted so that the rollers descend no farther than necessary and do not strike the bottle shoulder even though slide 330 continues to move downward.

In the space between the spacer blocks 350 and plates 352 and 354, a pair of arms 362 is mounted. Each of the arms 362 is pivotally mounted to the plates 352 and 354 on pivot pins 364. The arms 362 extend upwardly past the pins 364 and downwardly and outwardly therefrom. Each of the arms 362 includes a lower end section comprising opposed plates 366 joined together and pivoted to opposite sides of the arm 362 on pivot pins 368. Journalled between the lower ends of the plates 366 is a roller 370. Each of the rollers 370 is constructed of rubber or rubberlike material and will be referred to as elastomeric material. The peripheries of the rollers 370 are preferably truly cylindrical, whereas each of the rollers is hollow inwardly of its peripheral surface, as indicated at 372. By forming the rollers 370 with their peripheries truly cylindrical they fold the end portions of a stamp along a truly transverse line to extend downwardly along the bottle neck without wrinkling and the hollow interiors of the rollers permit the cylindrical surface to distort and snugly and accurately conform to the horizontal sectional shape of a bottle neck to thereby uniformly press a stamp thereagainst. Each of the arms 362 is formed with a socket 373 receiving a plunger 374 backed by a compression spring 376. The plungers 374 bear against blocks 378 mounted between side plates 366 and the springs 376 thus resiliently urge the rollers 370 toward each other and relative to the arms 362. Suitable stop means 380 may be adjusted to limit the inward movement of rollers 370 about their pivots 368.

The upper ends of the arms 362 are of reduced thickness and are provided with forwardly directed cam follower rollers 382. The cam follower rollers 382 extend into cam grooves 384 in an auxiliary cam plate 386 mounted between plates 352 and 354 for vertical sliding movement. See also Fig. 10 for a detailed illustration of the auxiliary cam plate 386. As shown, the cam grooves 384 extend substantially vertically throughout the upper portions of their lengths but their lower ends converge toward each other. Thus, when the auxiliary cam plate 386 is in a downward position relative to the plates 352 and 354, cam follower rollers 382 are in the upper or most widely spaced portion of the cam grooves 384 and rollers 370 are thus swung inwardly toward each other. When the auxiliary cam plate 386 is moved upwardly relative to plate 352, the cam grooves 384 are moved upwardly and the lower portions thereof force the upper ends of arms 362 inwardly toward each other to thus swing the rollers 370 outwardly away from each other, for a purpose to be described. The auxiliary cam plate 386 is adjustably mounted on an actuating bar 388 by means of a suitable bolt 390 extending through a slot 392 in the bar 388. The upper end of bar 388 is slidably guided in the lower portion of slide portion 340 in a machined groove 394 (see Fig. 9) and held therein by a retaining plate 395. The bar 388 is further provided with a rearwardly directed ear 396 pivoted between the legs of bifurcated rock lever 398 which is in turn pivotally mounted between spaced ears 400 at the lower end portion of slide 330. The rock lever 398 extends inwardly from the slide 330 and is provided at its innermost end with a cam follower roller 402 having a spherical outer surface in cam groove 80 of cam ring 76. It will thus be obvious that as long as cam grooves 78 and 80 are parallel and uniformly spaced there will be no relative movement between cam follower rollers 338 and 402 and, therefore, slide 330 and auxiliary cam plate 386 will rise and fall in unison in accordance with the shape of the fixed cam grooves. However, where cam grooves 78 and 80 come nearer to each other, the rock lever 398 acts to move auxiliary cam plate 386 downwardly relative to the cam follower rollers 382 on the arms 362. Likewise where the cam grooves 78 and 80 move farther apart the rock lever 398 acts to raise auxiliary cam plate 386 relative to rollers 382 and the arms 362 are thus swung in a manner to move their rollers 370 away from each other as described.

A further slide rod 404 is slidably guided in the head brace 328 (see Fig. 9) and extends downwardly therethrough and through a guide bushing 406 in the lower portion of slide 330. The rod 404 extends downwardly below the slide 330 and between the legs of bifurcated lever 398 and is provided with a forwardly extending foot 408 fixed to the lower end thereof. The foot 408 extends forwardly between the arms 362 and is provided with a pad 410 on its lower face consisting of a suitable friction material, preferably resilient, for example, rubber, cork or leather. The upper portion of rod 404 is provided with a collar 412 constituting a stop means to limit downward movement of rod 404 relative to head brace 328. A second collar 414 is fixed on the rod 404 in downwardly spaced relation to the collar 412. A compression spring 416 surrounds the rod 404 between collar 414 and head brace 328 and serves to constantly urge rod 404 downwardly relative to head brace 328. The boss 334 on slide 330 is provided with an opening 418 through which the rod 404 passes. However, the diameter of the opening 418 is less than the diameter of collar 414. Thus, upon upward movement of slide 330 toward its uppermost position, the upper surface of boss 334 engages collar 414 to thereby lift rod 404 against the action of spring 416. Upon initial downward movement of the slide 330 from its uppermost position, the slide and rod 404 move downward in unison until the pad 410 engages a bottle top, as will be described. Thereupon spring 416 holds the pad 410 clamped against a stamp extending across the top of a bottle, and at which time the needles 162 release the ends of that stamp. Then, continued downward movement of slide 330 results in downward movement of rollers 370 in contact with opposite sides of a bottle neck to roll the laterally extending portions of the stamp against the sides of the bottle neck until stops 358 engage plate 322.

Figure 9:
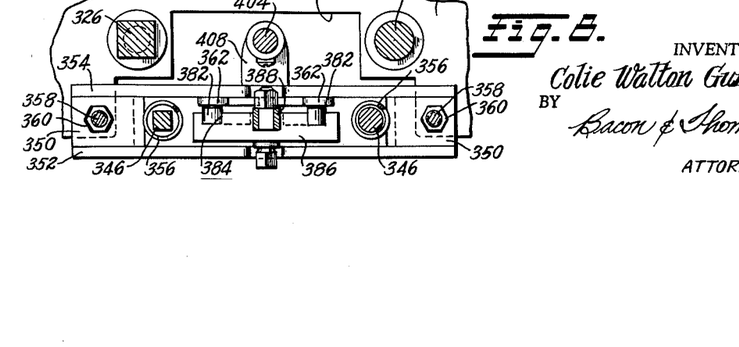
Fig. 9 is a vertical sectional view taken substantially through the vertical center of Fig. 7.

As previously described, the needle carriage 146 positions an elongated stamp horizontally over the top of a bottle on the turret at about the time that particular bottle reaches a position adjacent the lefthand upright post 3 of Fig. 1. The cam grooves 78 and 80 are so configured that the slide 330 and roller 402 start their downward movement and the pad 410 engages the midportion of the stamp and presses the same against the bottle top at about the same instant that cams 180 and 182 effect release of the ends of the stamp from needles 162. Up to this time, however, the rollers 370 are above pad 410 so that they do not engage the stamp before it is clamped to the bottle top by the pad 410. At that position the shape of cam groove 80 is such that it is relatively close to cam groove 78 and thus auxiliary cam plate 386 is in its lower position relative to the upper ends of arms 362. Thus, the rollers 370 are inwardly at their nearest approach toward each other when the pad 410 has completed firm clamping of the stamp against the bottle top and it is to be remembered that slide 330 is continually moving downwardly. Thus, rollers 370 move downwardly past pad 410, fold the end portions of a stamp against opposite sides of a bottle neck and firmly press those end portions of the stamp against the sides of the bottle neck to cause secure adherence. When the slide 330 and rollers 370 reach their lowermost position, as illustrated in Figs. 7 and 9, the contour of cam groove 80 again changes so that the follower 402 moves downwardly away from cam groove 78. Therefore, the rollers 370 remain at the same level adjacent the bottom ends of the stamp just applied but upward movement of auxiliary cam groove 80 swings the upper ends of arms 362 inwardly and rollers 370 outwardly. Thereafter, cam grooves 78 and 80 remain parallel but both rise uniformly so that the rollers 370 are withdrawn upwardly while out of contact with the stamp just applied. When slide 330 rises sufficiently it will engage the collar 414 on rod 404 and lift pad 410 from the bottle, thus completing the application of a stamp to a bottle on the turret. The rollers 370 are moved outwardly away from the newly applied stamp before they are moved upwardly so that there will be no tendency to slide the ends of the stamp upwardly or to displace the stamp after it has been applied to the bottle and before the adhesive has hardened or set.

From the time the needle carriages 146 position their stamps over a bottle on the turret 8 they remain in their innermost position throughout the operation of the presser means as just described. The presser means move downwardly and operate in the space between the circumferentially spaced needles 162 and are finally withdrawn upwardly as just described. The pressing of the stamp against the bottle is completed at about the time the bottle reaches the rear of turret 8, substantially opposite the transfer mechanism 22. After the presser means have been withdrawn upwardly, the contour of fixed cam 72 changes to start the needle carriages 146 moving outwardly. However, those carriages are moved outwardly only part of the way and are then stopped so that they will not move so far as to interfere with removal of bottles from turret 8 by transfer turret 30. After such bottles have been removed from turret 8, however, the needle carriages 146 are moved further outwardly to the outermost position and in position to receive a stamp from the transfer wheel 224. If no outward movement were imparted to the needle carriages 146 before removal of a stamped bottle from the turret 8, the cam 72 would have to be provided with a quite steep "rise" to effect outward movement of the needle carriages in the short distance between transfer turret 30 and the stamp transfer mechanism 22. Such sudden and rapid movement of the needle carriages is undesirable and is avoided in the manner described.

The needles 162 are impaled in portions of the glued stamps having wet glue thereon. It is, therefore, inevitable that an accumulation of glue will build up and harden on the needles 162 and eventually interfere with their proper operation. It is, therefore, contemplated that the machine be provided, at a suitable point in its cycle, with means for washing or otherwise cleaning the needles 162 after each cycle of operation. No such means are shown or described herein.

Figure 15:
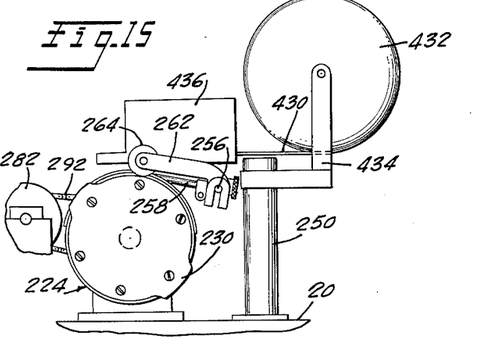
Fig. 15 is a schematic fragmentary view, similar to Fig. 3, of a portion of the machine illustrating a different form of stamp supply means.

Fig. 15 schematically illustrates a modified form of stamp supplying means wherein a continuous strip 430 of uncut stamps is wound on a reel 432 rotatably supported by a bracket 434 mounted on post 250, previously described. The strip 430 passes through a mechanism schematically shown at 436 for advancing the strip 430 one stamp length at each cycle and for severing the end stamp from the strip. Such strip advancing and cutting means are well known and need not be described in further detail and may be cyclically driven by shaft 256, previously described, or by any other suitable source of power operating in proper timed relation to the transfer wheel 224. The mechanism 436 delivers the cut stamps to a position over the transfer wheel 224 where it is withdrawn by suction arm 258 in the manner described in connection with Fig. 3.

While a single specific embodiment of the invention has been shown and described herein, it is to be understood that various modifications may be resorted to within the scope of the appended claims.

I claim:

1. In a machine for applying stamps or the like to containers; a rotary turret having a plurality of container positioning means thereon adapted to receive and carry containers, stamp transfer means at a fixed station adjacent said turret and radially outwardly of said container positioning means, stamp carrying means on said turret adjacent each of said container positioning means, each of said stamp carrying means being mounted for generally radial movement on said turret from an outer position aligned with said stamp transfer means to an inner position overlying and closely adjacent a container in its adjacent bottle positioning means, said stamp transfer means being arranged to sequentially receive individual stamps from a supply thereof and to hold and carry said individual stamps along a predetermined path having a portion substantially coincident with the path of rotation of said stamp carrying means when in said outer position, means for actuating said stamp transfer means to move stamps along said path at a speed equal to the linear speed of said stamp carrying means when in said outer position, and means for releasing a stamp from said stamp transfer means to said stamp carrying means in timed relation to movement of said carrying means past said transfer means.

2. A machine as defined in claim 1 wherein said stamp transfer means comprises a transfer wheel mounted for rotation on a fixed axis radial to the axis of rotation of said turret, and releasable clamping means for releasably holding stamps against the periphery of said wheel, said periphery defining said predetermined path.

3. In a machine for applying stamps or the like to containers, fixed shaft means defining a vertical axis, a first turret portion journalled on said shaft means and having container positioning means thereon, a second turret portion independently journalled on said shaft means and spaced upwardly from said first turret portion, stamp carrying means reciprocably mounted on said second turret portion for radial movement thereon, a cam fixed to said shaft means between said turret portions for reciprocating said stamp carrying means, means for rotating said first turret portion about said axis, and a driving connection extending upwardly from said first turret portion to said second turret portion outwardly of said cam whereby said first and second turret portions are rotated in unison.

4. A machine for applying elongated stamps or the like to containers and having a rotary turret with stamp carrying means thereon for receiving stamps from a supply thereof at a fixed station adjacent said turret and positioning said stamps over containers on said turret, said turret having vertically reciprocable presser means thereon for pressing said stamps across the top and down opposite sides of the containers, said stamp carrying means comprising, a carriage mounted on said turret for radial reciprocation thereon, the outermost end portion of said carriage comprising circumferentially spaced holding means for holding opposite end portions of a stamp, means for reciprocating said presser means and said carriage in timed relation to rotation of said turret so that said carriage is moved outwardly to receive a stamp from said stamp supplying means adjacent said turret and then inwardly to position the mid-portion of said stamp over the top of a container on said turret and thereafter to move said presser means downwardly between said holding means, and release means for releasing the end portions of said stamp from said holding means as said presser means moves downwardly.

5. A machine as defined in claim 4 wherein said holding means comprise hook-shaped needles having shank portions mounted on rock shafts, said rock shafts having non-circular radial openings therein, said shank portions being complementary in shape to said openings, and clamp means securing said shanks in said openings whereby to hold said needles in predetermined relation to said rock shafts.

6. In a machine for applying elongated stamps or the like to containers and having a rotary turret with stamp carrying means thereon arranged to hold the end portions of said stamps and to hold said stamps with their midportions over the tops of containers on said turret, vertically reciprocable presser means on said turret for pressing said stamps on said containers, said presser means comprising; a presser pad for clamping the midportion of a stamp against the top of a container, opposed rollers movable vertically relative to said presser pad for pressing the remaining portions of a stamp against opposite sides of a container, means resiliently urging said rollers toward each other, and actuating means operable in timed relation to rotation of said turret for first moving said presser pad downwardly to clamp said stamp against the top of said container, to thereafter release the end portions of said stamp from said carrying means, then to move said rollers downwardly along opposite sides of said container, and then moving said rollers out of contact with said bottle after they reach their lowermost position and thereafter moving said rollers and presser pad upwardly.

7. A machine as defined in claim 6 wherein said presser pad includes resilient means urging said presser pad downwardly on said turret, said rollers being mounted on a vertically reciprocable slide on said turret, said slide being adjacent said presser pad and engageable therewith to move said presser pad upwardly against the action of said resilient means upon upward movement of said slide toward the upper limit of its movement, the parts being so arranged that initial downward movement of said slide lowers said pad into engagement with said container prior to engagement of said rollers with the sides of said container.

8. A machine as defined in claim 6 wherein said presser means comprises a first vertically reciprocable slide on said turret, a second slide mounted on said first slide for vertical reciprocation thereon, resilient means urging said second slide downwardly relative to said first slide, stop means limiting the downward movement of said second slide on said first slide, and an adjustable stop element on said second slide engageable with a portion of said turret for limiting the downward movement of said second slide relative to said turret irrespective of the lowermost position of said first slide, said rollers being mounted on said second slide.

9. A machine as defined in claim 6 wherein said rollers are of elastomeric material, of normally cylindrical form, and hollow inwardly of their peripheries.

10. A machine as defined in claim 6 wherein said presser means comprises a vertically reciprocable slide on said turret, said rollers being mounted on said slide for lateral movement toward and from each other, a control cam movably mounted on said slide for moving said rollers laterally relative to each other, said actuating means comprising separate means for independently imparting movement to said slide relative to said turret and said control cam relative to said slide.

11. A machine as defined in claim 10 wherein said rollers are journalled on the ends of arms pivoted to said slide, said control cam being arranged to effect swinging movements of said arms.

12. A machine as defined in claim 10 wherein said rollers are journalled on the ends of arms pivoted to said slide, said control cam being arranged to effect swinging movements of said arms, said arms being pivotally jointed between their pivotal mounting on said slide and their said ends, stop means limiting swinging movement of said ends toward each other, and resilient means urging said ends toward said stop means.

References Cited in the file of this patent

UNITED STATES PATENTS

| | | |
|---|---|---|
| 2,131,606 | Von Hofe | Sept. 27, 1938 |
| 2,174,210 | Ginns et al. | Sept. 26, 1939 |
| 2,280,730 | Talbot | Apr. 21, 1942 |
| 2,394,007 | Paynter | Feb. 5, 1946 |
| 2,503,810 | Elsner | Apr. 11, 1950 |
| 2,528,912 | Rappaport et al. | Nov. 7, 1950 |
| 2,564,417 | Baber et al. | Aug. 14, 1951 |
| 2,657,816 | Everett | Nov. 3, 1953 |
| 2,695,721 | Fairest et al. | Nov. 30, 1954 |
| 2,725,156 | Manas | Nov. 29, 1955 |
| 2,751,103 | Scott | June 19, 1956 |
| 2,808,955 | Sherrington | Oct. 8, 1957 |
| 2,843,252 | Eddison et al. | July 15, 1958 |

FOREIGN PATENTS

| | | |
|---|---|---|
| 737,882 | Great Britain | Oct. 5, 1955 |
| 744,329 | Great Britain | Feb. 1, 1956 |